June 14, 1927.

A. G. HASKINS

DISHWASHING MACHINE

Filed May 6, 1921

Inventor
Arthur G. Haskins
by
Attorney

June 14 1927.

A. G. HASKINS

DISHWASHING MACHINE

Filed May 6, 1921

Inventor
Arthur G. Haskins
by Ellis Spear Jr.
Attorneys

June 14, 1927.

A. G. HASKINS 1,632,182

DISHWASHING MACHINE

Filed May 6, 1921

Inventor
Arthur G. Haskins
by his Attorney

June 14, 1927.

A. G. HASKINS 1,632,182

DISHWASHING MACHINE

Filed May 6, 1921

Inventor
Arthur G. Haskins
by Ellis Spear
Attorney

Patented June 14, 1927.

1,632,182

UNITED STATES PATENT OFFICE.

ARTHUR G. HASKINS, OF WEYMOUTH, MASSACHUSETTS, ASSIGNOR TO ALVA M. DOW, OF BRAINTREE, MASSACHUSETTS.

DISHWASHING MACHINE.

Application filed May 6, 1921. Serial No. 467,350.

This invention relates to dish washing machines, and has for its object to provide a reliable and efficient machine of the class indicated. This object, together with certain features of advantage, which will appear more fully hereinafter is secured in the machine of the present invention.

In the following specification and accompanying drawings, I shall disclose a commercial embodiment of my machine which has been found satisfactory in use and well adapted to the requirements of manufacture. Throughout the specification and drawings, like reference characters are correspondingly employed, and in the drawings.

Figure 5:
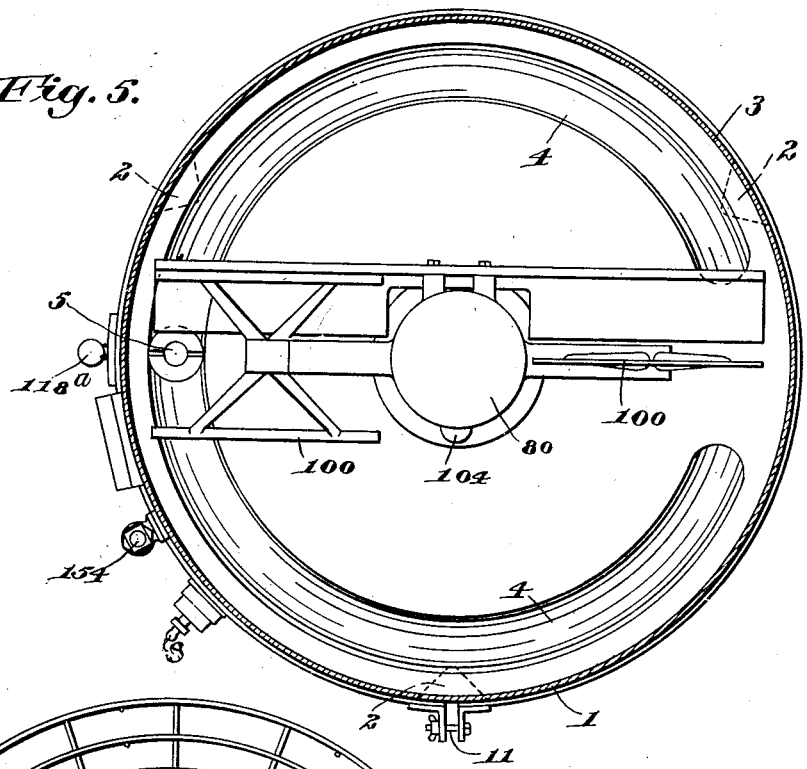
Fig. 5 is a horizontal section taken on a plane just above the propeller blades in Fig. 1.
Figure 6:
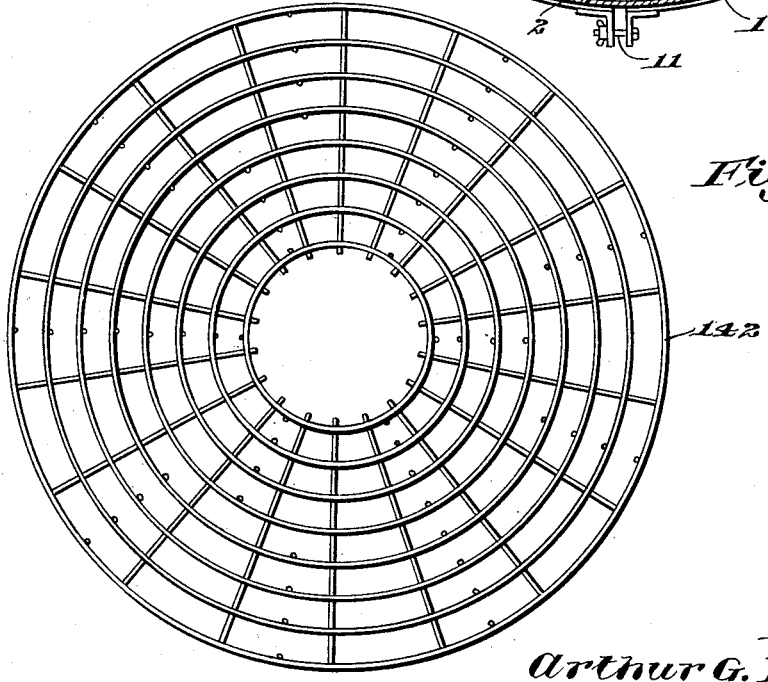
Fig. 6 is a detail view of the dish tray.

I have indicated at 1 a base ring to which are connected a plurality of suitable legs 2 for supporting the washer at a proper elevation. The legs 2 have brackets $2^1$ at their upper ends on which is supported a cylindrical tank 3 which is slipped within the ring 1. The ring 1 is split as at 11 (Fig. 5) and tightened by a suitable bolt so that the tank 3 is snugly clamped, and resting on the brackets $2^1$ of the legs, is thus firmly supported.

The bottom of the tank 3 is provided on each side with circumferential grooves or depressions 4 (Figs. 1 and 5) which lead to a drain outlet 5, and are gradually deepened as they approach said outlet. Between the grooves 4, the bottom of the tank 3 slopes slightly outward from a central portion on which is mounted a stuffing box or pedestal 6.

The pedestal 6 comprises a cylindrical bearing 60 (Fig. 3) having an annular basal flange 61 resting on the bottom of the tank 3 and a central tubular depending portion 62 which extends downwardly through the bottom of the tank into a housing 70 and is threaded externally below the top wall of said housing to receive a nut 63. The bottom of the tank 3 is thus clamped between the top wall of the housing 70 and the lower surface of the annular flange 61 making a watertight joint.

Fitted snugly over the bearing 60 is a rotatable support or rotor 80 which has an annular flange 81 bearing on the flange 61. Journaled axially through the bearing 60 and rotor 80 is a drive shaft 90. Fast to the upper end of shaft 90 is a bevel gear 91 meshing with a bevel gear 92 on a horizontal shaft 93 journaled in said rotor and provided with a plurality of water distributing blades or paddles 100.

The water distributing blades or propellers 100 are therefore not only rotated about a horizontal axis (shaft 93) but in addition are rotated as a unit about a vertical axis (shaft 90) by the rotation of the rotor 80. Both rotor and propellers receive their motion from gear 91 on shaft 90, so that when the machine is in use, rotor 80 has a speed of approximately twenty revolutions per minute and the propellers 100 rotate at the rate of approximately sixteen hundred revolutions per minute. The propellers 100 force the water upwardly in two vertical streams, which, due to the rotation of the rotor and with it the propellers about shaft 90 as an axis, causes these streams to rotate at approximately twenty revolutions per minute, thus throwing the water in multitudinous directions and angles against the dishes.

The housing 70 contains a pocket 101 concentric with the shaft 90. Pinned to shaft 90 and overlying said pocket is a circular mushroom deflector 102 which may be of soft rubber if desired.

Figure 2:
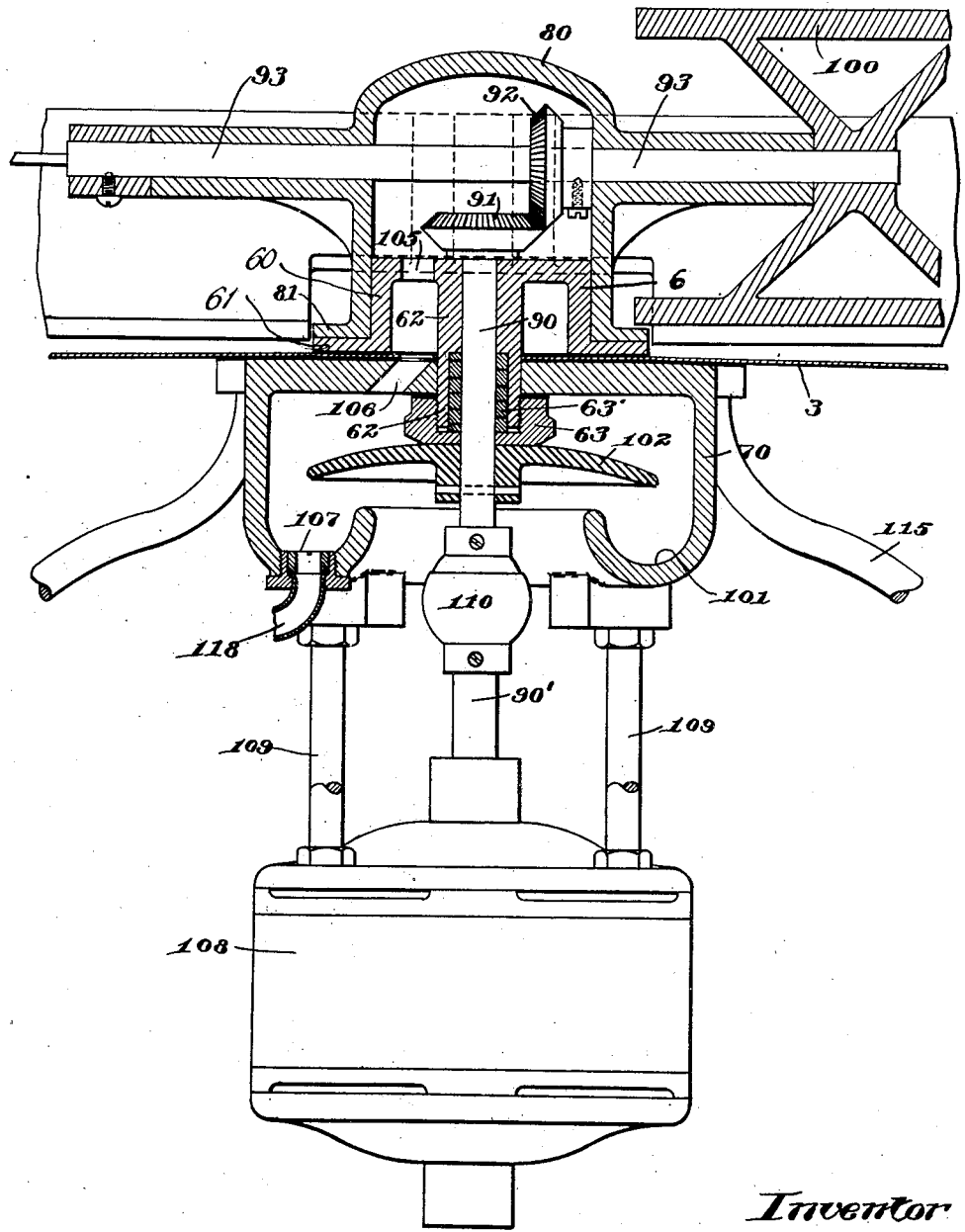
Fig. 2 is a partial section through the rotor.

Drilled in the rotor 80 is a hole 103 the lower edge of which maintains a correct water level. Over this hole 103 is a lip 104 (Fig. 3) so that water can not flow into the hole from above. In the pedestal 6 is a hole 105 which allows the water discharging from hole 103 to flow through hole 106 onto deflector 102 in housing 70 and thence into pocket 101 which is provided with a hole 107 (Fig. 2) connected by a flexible pipe 118 with drain valve 117. This construction prevents any leakage past the packing 63¹ for shaft 90 and the drain from 103 from dripping onto the motor 108.

Figure 4:
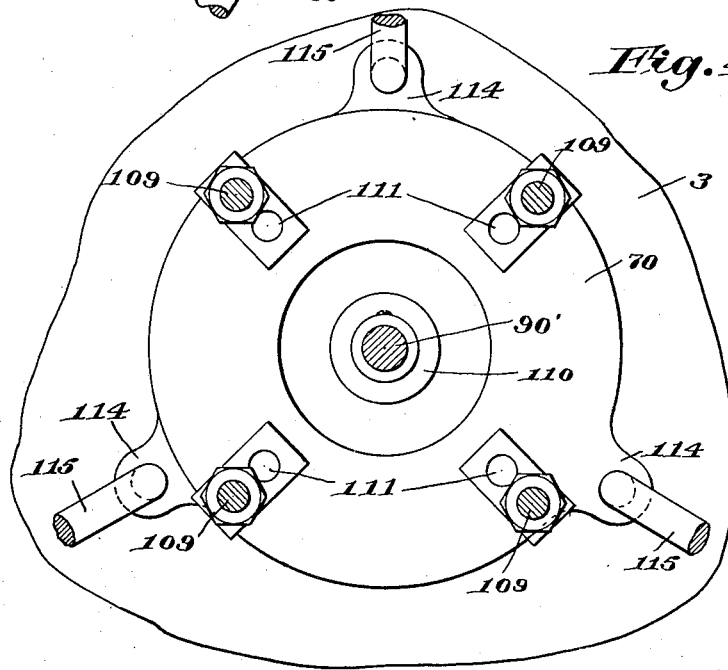
Fig. 4 is a horizontal section on the line 4—4 of Fig. 1, particularly showing the attachment of the motor to the housing therefor.

The motor 108 is attached to housing 70 by bolts 109. The motor shaft 90¹ is attached to the shaft 90 by a universal joint 110 so that absolute alignment of said shafts 90 and 90¹ is therefore unnecessary. In housing 70 are also drilled a second set of concentric bolt holes 111 (Fig. 4) so that it is possible to change to a different sized motor, as in changing from direct current motor to alternating current motor. The switch for the motor is indicated at S, Fig. 5.

Figure 3:
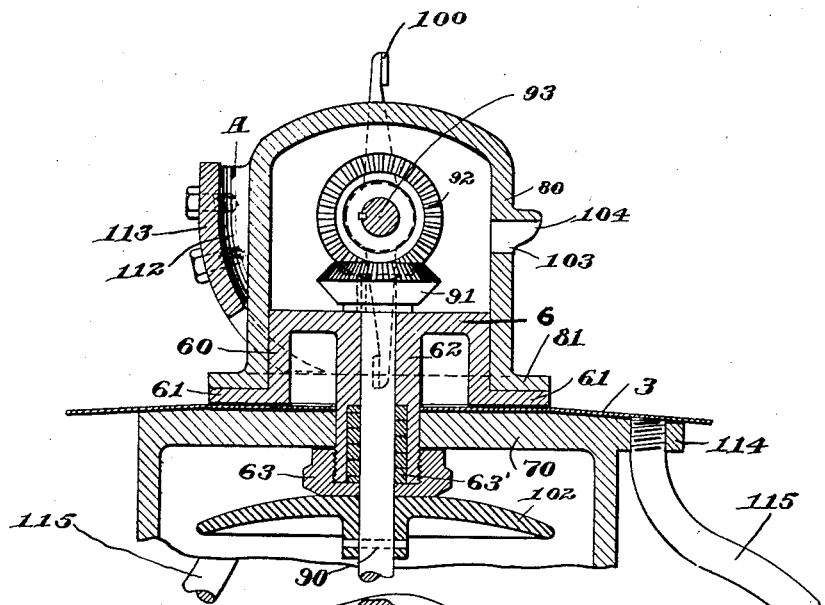
Fig. 3 is an enlarged section on the line 3—3 of Fig. 1.

On the rotor 80 is cast a boss 112 which is tapped to receive a deflecting apron or guard 113 (Fig. 3). The guard 113 prevents water leaving the rotating propellers 100 except at point A. The water is therefore directed vertically upwards past guard 113 and inasmuch as the propellers 100 have also a rotating motion about shaft 90 as an axis, the water is caused to spread outwardly thereby covering the entire surface of the superposed dish, silver and glass trays.

Figure 1:
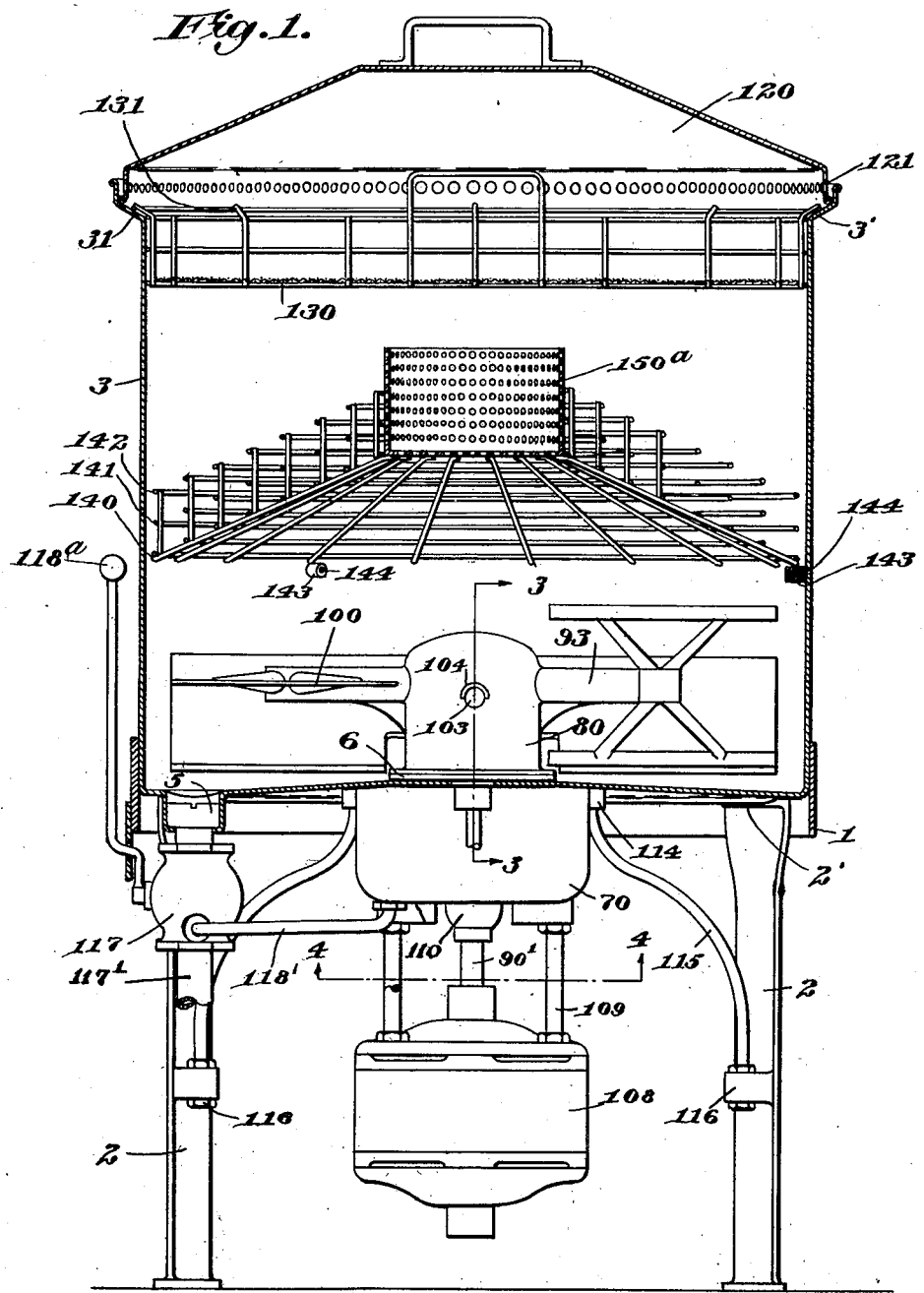
Fig. 1 is a vertical section through a dish washing machine in accordance with my invention.

The housing 70 has cast thereon three bosses 114 which are drilled to receive leg supports 115 (Fig. 1). The supports 115 run out to the three legs 2 of the tank and are there fastened as indicated at 116. Thus the machine assembly consisting of rotor 80, pedestal 6, housing 70 and motor 108 are tied together rigidly to legs 2.

To the outlet 5 is attached drain valve 117 operated by handle 118ᵃ (Fig. 1) and connected at point B by pipe 118 with hole 107 in housing 70 so that water shed by mushroom deflector 102 drains through hole 107 and flexible pipe 118' to point B in drain valve 117, which point is below the barrel of the valve. The drain pipe for valve 117 is indicated at 117¹, Fig. 1.

The rim of the cover 120 is perforated throughout its entire circumference by holes 121 (Fig. 1). This allows air to escape due to the sudden expansion in the tank when hot water is thrown suddenly by propellers 100 into the tank.

Figure 10:
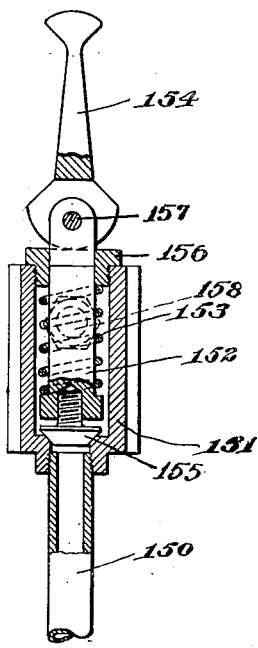
Fig. 10 is a detail section through the self-closing hot water inlet valve.

Hot water is supplied to the tank 3 from a supply pipe 150, Fig. 10, which is threaded at its upper end into a valve casing 151.

In order to avoid all possibility of the control valve for the hot water supply being carelessly left open, said valve is of the self-closing type comprising, as here shown, a valve stem 152 slidable in the casing 151 and a valve piece 155 mounted on said stem and seating over the upper end of the supply pipe 150.

The valve 155 is normally urged to its seat by a coil spring 153 confined in said casing 151 between a threaded collar 156 which closes the upper end of the casing, and a shoulder at the lower end of the valve stem.

The valve stem is actuated by a cam lever 154 which is forked and connected to the upper end of said stem at 157. When said lever is operated to raise the stem and unseat the valve, the spring 153 is compressed, so that upon release of the lever the spring instantly expands to force the valve to its seat and to maintain the valve seated.

The water admitted into casing 151 passes therefrom into tank 3 through inlet opening 158.

Figures 7, 8, 9:
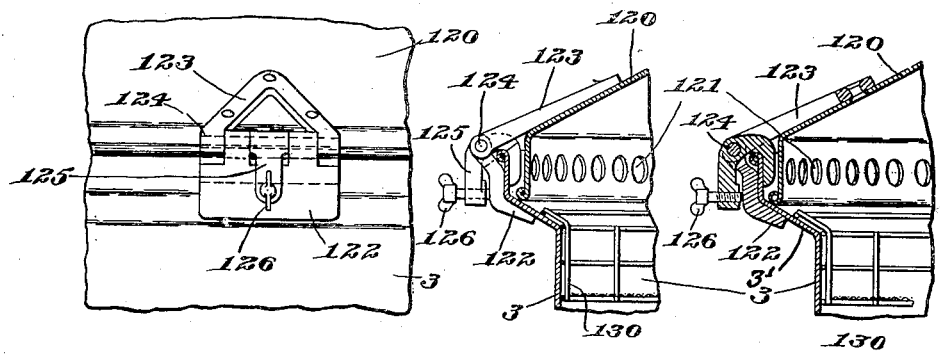
Figs. 7, 8 and 9 are details showing the hinge connection for the cover.

The cover 120 is attached to the base of the hinge 122 by means of casting 123 and pin 124 (Figs. 7, 8 and 9). The casting 125 is also drilled and attached to the hinge assembly by means of pin 124. Butterfly nut 126 clamps the casting 123 firmly to the rim of tank 3. By loosening the nut 126, the hinge 122 may be moved and again fastened at any desirable point on the rim of tank 3.

Hung within the upper end of the tank 3 is a glass tray 130. The tray 130 is a shallow cylindrical cage having its upper edge 131 outturned to overlie the outwardly flaring rim 3¹ of the tank 3.

The dish tray is a conical wire rack member comprising a triple series of concentric rings 140—141—142 (Fig. 1). The ring series progresses radially towards the center in upward steps or gradations with the lower outer ring series 140 resting on three inwardly projecting studs 143 set in the tank 3 by means of screws 144 tapped in from the outside.

The silver tray 150ᵃ is preferably a cylindrical screen member having open sides and bottom. The tray 150ᵃ rests upon the inwardly extended ends of the radial wire members of the dish rack 140 and is thus supported centrally thereof and extends axially down into the dish rack, as shown in Fig. 1.

What I therefore claim and desire to secure by Letters Patent is:

1. In a washer, a tank having a drain pipe, a rotor in said tank having a water inlet opening, a housing below said rotor having an inlet opening for the water from the rotor and a discharge opening, a drain valve controlling said drain pipe of the tank, and a connection between said discharge opening of the housing and the pipe at a point below said valve.

2. A washer having a tank for holding a cleansing fluid, a rotor in said tank having a water inlet opening, a housing below said rotor having a discharge opening, a shaft, a shaft bearing extending from the rotor through the tank into the housing, a deflector surrounding said shaft and projecting from the bearing in the housing, and there being a water connection between the rotor and the housing over the deflector whereby water entering the rotor through said inlet will pass into the housing and be deflected from the bearing and be discharged from the housing.

3. In a washer, a tank having a drain pipe, a rotor mounted in said tank and having a water inlet opening a housing below said rotor having an inlet opening for the water from the rotor, said housing having a pocket and a discharge opening in said pocket, a valve controlling said drain pipe of the tank, a connection between said discharge opening of the pocket and the pipe at a point below said valve and a deflector mounted within said housing above said pocket.

4. In a washer having a tank for holding a cleansing fluid, a rotor in said tank having a water inlet opening, a housing below said rotor having a pocket and a discharge opening in said pocket, a shaft, a shaft bearing extending from the rotor through the tank into the housing, a deflector surrounding said shaft and projecting from the bearing in the housing, there being a water connection between the rotor and the housing to permit water to pass from the rotor into the housing and be deflected from the bearing into the pocket and then be discharged therefrom.

5. In a washer having a tank for holding a cleansing fluid, a housing disposed beneath the tank having a pocket and a water discharge opening in said pocket, a bearing resting on the bottom of the tank having a shaft-bearing portion extending through the bottom of the tank and the top of the housing, there being a water passage extending through the bearing and the bottom of the tank and the top of the housing, a rotor in said tank having a closed top and an open bottom for mounting on said bearing and an inlet to admit water into the rotor, a shaft extending through said bearing portion, a motor suspended from said housing centrally thereof and operatively connected to said shaft and a deflector within the housing to deflect into said pocket and away from the motor water entering the housing through said water passage or through said shaft bearing portion.

In testimony whereof I affix my signature.

ARTHUR G. HASKINS.